July 24, 1934.  J. L. FINCH  1,967,572
PIEZO ELECTRIC CRYSTAL HOLDER
Filed Nov. 19, 1929
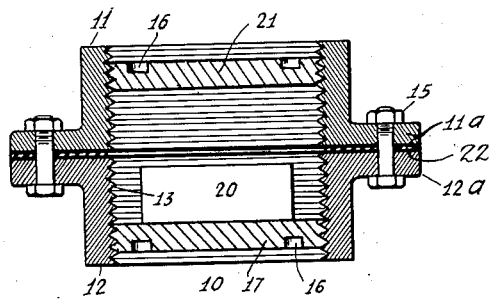
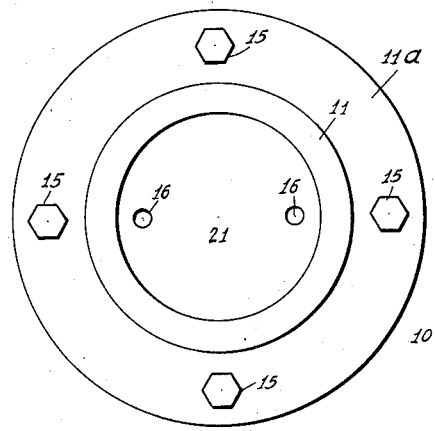
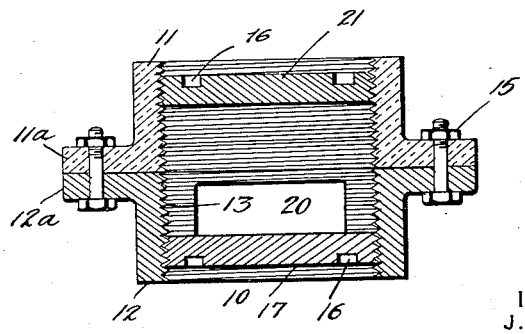
INVENTOR
J.L. FINCH
BY
ATTORNEY Patented July 24, 1934

1,967,572

UNITED STATES PATENT OFFICE 1,967,572

PIEZO-ELECTRIC CRYSTAL HOLDER

James L. Finch, Port Jefferson, N. Y., assignor to Radio Corporation of America, a corporation of Delaware Application November 19, 1929, Serial No. 408,186

17 Claims. (Cl. 171—327)

This invention relates generally to the piezo-electric art and deals more specifically with a piezo-electric crystal holder.

It is well known in this art that the natural period of vibration of a piezo-electric crystal of the type now commercially used for frequency stabilizing in a transmitter and also for frequency standards, depends primarily upon the dimensions of the crystal element. It has been found in practical operation, however, that the temperature of the crystal is an appreciable factor, and that variations thereof cause variations in the dimensions of the crystal, due to expansion or contraction of the same. In addition to this, variations in the temperature of the crystal housing play an important part. As the temperature of the crystal housing changes the housing expands or contracts, as the case may be, with the result that the spacing between the plates which are fixedly mounted within the holder is varied. Variation in the spacing of the plates with respect to the crystal changes the period of vibration of the crystal. To decrease the variations in period due to the above mentioned temperature effects, it has been common practice heretofore to use some automatic control device for maintaining the crystal at a constant temperature. However, with the best means of automatic temperature control available commercially there has been found to be sufficient variation to cause a detrimental change in period of vibration.

It is therefore an object of this invention to provide a housing for a piezo-electric crystal, which housing compensates for any changes in period due to temperature effects on the crystal by producing corrective effects in the holder.

Further it is an object of this invention to provide a piezo-electric crystal housing in which the inherent reaction of temperature changes of the housing upon the crystal is automatically compensated for during the operation of the device.

It is a further object of this invention to provide a piezo-electric crystal housing of a construction which permits adjustment of the parts of the housing with respect to the crystal, whereby certain frequency adjustments may be made by means of the housing itself.

It is a further object of this invention to provide a crystal housing, which permits a wide range of adjustability of the electrodes of the housing with respect to the crystal, in order to compensate for various physical changes in the crystal during its operation.

It is a further object of this invention to provide a crystal housing having an overall temperature coefficient which bears a certain predetermined relation with respect to the temperature coefficient of the crystal element.

It is a further object of this invention to provide a piezo-electric crystal holder in which the overall thermal coefficient may be varied by adjustment of certain elements of the housing.

It is a further object of this invention to provide a piezo-electric crystal holder which has the property of automatically correcting for temperature variations and at the same time is readily adjustable to crystals for any frequency within the range normally required.

And finally, it is an object of this invention generally to improve piezo-electric crystal housings, whereby to render them cheap to construct, easy to manipulate, and reliable and efficient in their operation.

The manner in which the present invention is carried out will be readily apparent to those skilled in the art from the following description taken in connection with the accompanying drawing, in which:

Fig. 1 is a sectional view of the crystal holder, the section being taken along a diameter thereof.

Fig. 2 is a plan view of the device shown in Fig. 1; and

Fig. 3 is a sectional view showing another modification of this invention.

Referring in detail to the drawing, the holder 10 is seen to comprise an annular casing composed of upper section 11 and lower section 12, both of which are internally threaded at 13. Flanges 11a and 12a serve as a means whereby the upper and lower sections may be clamped together as, for example, by the bolts 15. In the event that the upper and lower sections are both of a conducting material, any suitable layer of insulating material as indicated at 22, of annular shape corresponding to the width of the flanges 11a and 12a may be provided for the purpose of electrically insulating 11 and 12 from each other, of course it will be necessary to insulate by any suitable means the clamping bolts 15.

Mounted within the lower section 12 of the annular casing is a circular electrode 17 formed of any suitable metal such as Monel metal for example, threaded at its periphery to engage with the threads 13. Any suitable slots or depressions 16 may be formed in the under surface of the electrode 17 as viewed in Fig. 2 to permit the insertion of a tool whereby the electrode may be rotated within the section 12 of the casing in order to adjust the same vertically of the casing.

Of course, any other mechanical expedient may be provided to facilitate rotation of the electrode 17 within the section 12 either by hand or by a tool.

The crystal 20 is adapted to lie upon the electrode 17 as shown for example in Fig. 1.

A second electrode 21 similar to electrode 17 is mounted internally of the section 11 in screw-threaded relation therewith and vertically adjustable within the section, whereby the electrode may be adjusted in its position with respect to the crystal and also with respect to the electrode 17. The electrode 21 also is provided with some suitable mechanical expedient to facilitate the rotation of the same within the section 11.

Obviously, the electrodes 17 and 21 are provided with some terminal means, not shown in the drawing, to enable the crystal to be connected in an electrical circuit. This particular feature is so old and well known in the art that it needs no illustration here.

In another modification of this invention and in order to insure the proper spacing of the electrodes with respect to the crystal, as the crystal changes its dimensions in accordance with variations in temperature, the sections 11 and 12 may be formed of different materials having certain predetermined temperature coefficients as follows:

The upper section 11 as shown in Fig. 3, is formed of a material having a temperature coefficient higher than that of the quartz crystal. A material which is suitable for this purpose is bakelite, for example. The lower section 12 is of a material which has a temperature coefficient which is lower than that of the crystal. A material suitable for this purpose is invar, for example. While certain specific materials have been mentioned herein for the sections 11 and 12, it will be understood that these are merely given by way of illustration, and that many other materials having similar desirable properties may be used without departing from the spirit of this invention.

The operation of the device is as follows:

In case it is desired to maintain a constant air gap between the crystal and the upper electrode 21 under conditions of varying temperature, the upper and lower electrodes may be screwed either up or down, maintaining the air gap as required, until the total or overall expansion of the casing between the two electrodes will be equal to that of the crystal, the upper section being somewhat greater and the lower section being somewhat less. Now, if it is desired to adjust the device in such a way that the air gap will increase with an increase in temperature it is merely necessary to adjust the position of the electrodes to a point higher than the aforesaid adjustment, while if it is desired to decrease the air gap with an increase in temperature the electrodes are adjusted vertically of the casing to a point lower than said first mentioned point of adjustment. The exact amount of these various adjustments obviously will vary in accordance with the character of the materials used for the casing. The proper adjustments, however, for a casing of a given combination of materials may be readily determined by trial and error. It will thus be seen that, if it is desired to change the air gap between the crystal and the upper electrode in a certain predetermined manner, to compensate for crystal frequency variations with temperature, the character of adjustment may be readily realized in accordance with the foregoing methods of adjustment. It is, therefore, possible not only to maintain the spacing of the electrodes constant with respect to the crystal, but it is also possible, in accordance with the principles of this invention, to provide for variation of the electrodes with respect to the crystal, in such a way as to give a predetermined desired compensating effect as the temperature of the crystal varies.

It will be understood that many changes in the specific embodiment of the invention as herein disclosed will readily suggest themselves to those skilled in the art without departing from the spirit of this invention. The scope of this invention, therefore, is not to be limited by the details of this disclosure except as defined in the appended claims.

Having thus described my invention, I claim:

1. The combination of a piezo-electric oscillator with a housing therefor, said housing comprising a cylindrical casing formed of complementary sections, a first electrode adjustably mounted within and supported by said cylindrical casing, and a second electrode adjustably mounted within and supported by said cylindrical casing.

2. The combination of a piezo-electric oscillator with a housing therefor, said housing comprising a cylindrical casing formed of complementary sections bolted together at its center, a first electrode adjustably mounted within and supported by said cylindrical casing, and a second electrode adjustably mounted within and supported by said cylindrical casing.

3. The combination of a piezo-electric oscillator with a housing therefor, said housing comprising a cylindrical casing having upper and lower separable cylindrical sections being internally screw threaded, a first disc like electrode threaded adjustably in said upper section, a second disc like electrode adjustably threaded in said lower section, and means to hold said sections together.

4. The combination of a piezo-electric oscillator having a predetermined temperature coefficient of expansion with a housing therefor, said housing having a first section formed of a material having a higher temperature coefficient than said oscillator and a second section formed of a material having a temperature coefficient of expansion lower than said oscillator, a separate electrode in each of said sections, and screw threaded means for fixing said electrodes to said sections.

5. The combination of a piezo-electric oscillator having a determinable temperature coefficient of expansion with a housing therefor, said housing having a first section formed of a material having a higher temperature coefficient of expansion than said oscillator and a second section formed of a material having a temperature coefficient of expansion lower than said oscillator, and a separate electrode adjustably mounted in each of said sections.

6. A housing for a piezo-electric crystal comprising a casing having an upper and a lower section, each of said sections being formed of a material having a different coefficient of expansion from the other section, an electrode mounted in each of said sections, and means carried by each of said sections and by each electrode whereby the electrodes may be adjusted vertically of the casing.

7. A housing for a piezo-electric crystal comprising a casing having an upper and a lower cylindrical internally screw threaded section, each of said sections having different coefficients of expansion, an electrode screwed in each of said sections, said electrodes being so positioned relative to each other within said casing that variations in the temperature of said casing causes a predetermined vertical movement of the electrodes with respect to each other.

8. In a housing for a piezo-electric crystal, a pair of electrodes, a first cylindrical internally threaded means to support one of said electrodes, and a second cylindrical internally threaded means to support the other of said electrodes, each of said first and said second means having a different coefficient of thermal expansion.

9. The combination of a piezo-electric crystal oscillator having a coefficient of thermal expansion with a housing therefor, said housing comprising a first electrode externally threaded, a first cylindrical means internally threaded to support said electrode, a second externally threaded electrode, and a second cylindrical means internally threaded to support said second electrode, said first means having a coefficient of thermal expansion greater than that of said crystal and said second means having a coefficient of thermal expansion less than that of said crystal.

10. A housing for a piezo-electric crystal comprising a pair of internally threaded cylinders having an annular flange, insulating material interposed between said cylinders, clamping means for fixing the cylinders together, a disc like externally threaded electrode screwed into one of said cylinders, and another disc like externally threaded electrode screwed into the other cylinder.

11. A housing for a piezo-electric crystal comprising an internally threaded cylindrical structure formed of complementary sections insulatingly bolted together at its center, and, a pair of electrodes externally threaded, screwed into said cylindrical structure between which a piezo-electric crystal may be excited.

12. A piezo-electric crystal holder comprising a housing formed of complementary internally threaded sections with insulating means between each of said complementary sections, a disc-like externally threaded electrode screwed in each one of said complementary sections between which a piezo-electric crystal is interposed.

13. A piezo-electric crystal holder comprising a housing formed of a pair of complementary shaped sections having a flange, an insulated member interposed between said flanges, said separate sections being held together by clamping means, a disc-like externally threaded electrode screwed in each one of said complementary sections between which a piezo-electric crystal is interposed.

14. A piezo-electric crystal holder comprising a housing formed by upper and lower complementary shaped sections having a flange, the said upper section being of insulating material and said lower section being of metal, and clamping means to retain both the upper and lower sections together, and a disc-like electrode screwed into each one of said sections between which a piezo-electric crystal is interposed.

15. A piezo-electric crystal holder comprising a quartz piezo-electric crystal contained within a housing formed of an upper and lower casing having complementary flanged shaped sections, the said upper section formed of insulating material having a temperature of coefficient higher than said quartz crystal, the lower section formed of metallic material having a temperature of coefficient lower than said quartz crystal clamping means to retain both the upper and the lower sections together, and a disc-like electrode screwed into each one of said sections between which said piezo-electric crystal is interposed.

16. A piezo-electric crystal holder comprising a housing formed of a pair of complementary shaped sections, each section having a flange provided with a plurality of apertures, an insulated member interposed between said flanges and clamping means comprising a plurality of bolts passing through said apertures to retain both complementary sections together, a disc-like externally threaded electrode screwed into each one of said complementary sections between which a piezo-electric crystal is interposed.

17. A piezo-electric crystal holder comprising a housing formed by upper and lower complementary shaped sections, each section having a flange provided with a plurality of apertures, the said upper section being of insulating material and the said lower section being of metal, and clamping means comprising a plurality of bolts passing through said apertures to retain both sections together, and a disc-like electrode screwed into each one of said sections between which a piezo-electric crystal is interposed.

JAMES L. FINCH.